(12) United States Patent
Priedeman, Jr. et al.

(10) Patent No.: US 6,790,403 B1
(45) Date of Patent: Sep. 14, 2004

(54) SOLUBLE MATERIAL AND PROCESS FOR THREE-DIMENSIONAL MODELING

(75) Inventors: William R. Priedeman, Jr., Long Lake, MN (US); Andrea L. Brosch, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 10/019,160

(22) PCT Filed: Apr. 19, 2000

(86) PCT No.: PCT/US00/10592

§ 371 (c)(1),
(2), (4) Date: Jan. 8, 2002

(87) PCT Pub. No.: WO00/62994

PCT Pub. Date: Oct. 26, 2000

Related U.S. Application Data

(60) Provisional application No. 60/130,165, filed on Apr. 20, 1999.

(51) Int. Cl.[7] .......................... B06B 1/02; B29C 41/02; C08J 5/00; C08L 31/02; C08L 33/12
(52) U.S. Cl. .................... 264/442; 264/308; 264/317; 524/556; 524/560
(58) Field of Search ................ 524/556, 560; 264/308, 317, 401, 442, 497

(56) References Cited

U.S. PATENT DOCUMENTS

| | | | |
|---|---|---|---|
| 4,961,154 A | * 10/1990 | Pomerantz et al. | 264/401 X |
| 5,474,719 A | * 12/1995 | Fan et al. | 264/401 |
| 6,070,107 A | 5/2000 | Lombardi et al. | 700/119 |
| 6,228,923 B1 | 5/2001 | Lombardi et al. | 524/425 |

OTHER PUBLICATIONS

Paper entitled "High Temperature Fused Deposition Modelling: An Experimental Study Focusing on Modelling Materials", by F.K. Feenstra, from Time–Compression Technologies '98 Conference (Oct. 13–14, 1998, Nottingham, U.K.).

* cited by examiner

*Primary Examiner*—Leo B. Tentoni
(74) *Attorney, Agent, or Firm*—Kinney & Lange, P.A.

(57) ABSTRACT

A process for three-dimensional modeling in which an alkali-soluble thermoplastic material is used in an additive deposition process to form a soluble support structure (28) for a three-dimensional object (26) under construction. The alkali-soluble thermoplastic material includes a base polymer of carboxylic acid and a plasticizer. Following formation, the object (26) is placed in an alkaline bath to dissolve the support structure (28). The alkali-soluble material can be used to form an alkali-soluble three-dimensional object (26).

37 Claims, 2 Drawing Sheets

SOLUBLE MATERIAL AND PROCESS FOR THREE-DIMENSIONAL MODELING

CROSS-REFERENCE TO RELATED APPLICATIONS this application is United States national phase entry of PCT International Application No. US00/10592, filed on Apr. 19, 2000, which claims the benefit of U.S. Provisional Application No. 60/130,165, filed Apr. 20, 1999.

BACKGROUND OF THE INVENTION

This invention relates to the fabrication of three-dimensional objects using additive process modeling techniques. More particularly, the invention relates to forming three-dimensional objects by depositing solidifiable material in a predetermined pattern and providing support structures to support portions of such a three-dimensional object as it is being built.

Additive process modeling machines make three-dimensional models by building up a modeling medium, based upon design data provided from a computer aided design (CAD) system. Three-dimensional models are used for functions including aesthetic judgments, proofing the mathematical CAD model, forming hard tooling, studying interference and space allocation, and testing functionality. One technique is to deposit solidifiable modeling material in a predetermined pattern, according to design data provided from a CAD system, with the build-up of multiple layers forming the model.

Examples of apparatus and methods for making three-dimensional models by depositing layers of solidifiable modeling material from an extrusion head are described in Crump U.S. Pat. No. 5,121,329, Batchelder, et al. U.S. Pat. No. 6,303,141, Crump U.S. Pat. No. 5,340,433, Batchelder, et al. U.S. Pat. No. 5,402,351, Danforth, et al. U.S. Pat. No. 5,738,817, Batchelder, et al. U.S. Pat. No. 5,764,521 and Swanson et al. U.S. Pat. No. 6,004,124, all of which are assigned to Stratasys, Inc., the assignee of the present invention. The modeling material may be supplied to the extrusion head in solid form, for example in the form of a flexible filament wound on a supply reel or in the form of a solid rod, as disclosed in U.S. Pat. No. 5,121,329. As described in U.S. Pat. No. 4,749,347, modeling material may alternatively be pumped in liquid form from a reservoir. In any case, the extrusion head extrudes molten modeling material from a nozzle onto a base. The extruded material is deposited layer-by-layer in areas defined from the CAD model. A solidifiable material which adheres to the previous layer with an adequate bond upon solidification is used as the modeling material. Thermoplastic materials have been found particularly suitable for these deposition modeling techniques.

Examples of apparatus and methods for making three-dimensional models by depositing solidifiable material from a jetting head are described, for example, in Helinski U.S. Pat. No. 5,136,515, Masters U.S. Pat. No. 4,665,492 and Masters U.S. Pat. No. 5,216,616. Particles are directed to specific locations in a predetermined pattern as defined by a CAD model, and deposited and built up to construct the desired object.

In creating three dimensional objects by additive process techniques, such as by depositing layers of solidifiable material, it is the rule rather than the exception that supporting layers or structures must be used underneath overhanging portions or in cavities of objects under construction, which are not directly supported by the modeling material itself. For example, if the object is a model of the interior of a subterranean cave and the cave prototype is constructed from the floor towards the ceiling, then a stalactite will require a temporary support until the ceiling is completed. Support layers or structure may be required for other reasons as well, such as allowing the model to be removed from a base, resisting a tendency for the model to deform while partially completed, and resisting forces applied to a partially completed model by the construction process.

A support structure may be built utilizing the same deposition techniques and apparatus by which the modeling material is deposited. The apparatus, under appropriate software control, produces additional geometry acting as a support structure for the overhanging or free-space segments of the object being formed. Support material is deposited either from a separate dispensing head within the modeling apparatus, or by the same dispensing head that deposits modeling material. The support material is chosen so that it adheres to the modeling material. Anchoring the model to such support structures solves the problem of building the model, but creates the additional problem of removing the support structure from the finished model without causing damage to the model.

The problem of removing the support structure has been addressed by forming a weak, breakable bond between the model and the support structure, such as is described in Crump, et al. U.S. Pat. No. 5,503,785. The '785 patent discloses a process by which a material that forms a weak, breakable bond with the modeling material is selected as a release material. The release material is deposited along the interface between the object and its support structure in a layered fashion or as a coating, permitting the support structure to be broken away after formation of the object. The support structure may be formed of the modeling material or it may be formed of the release material.

The '785 patent discloses various combinations of materials that may be used as modeling and release materials. For instance, the '785 patent discloses that a soluble release material may be utilized, so that any such material remaining on the model after the support is broken away can be removed by placing the model in a bath. Water soluble wax, polyethylene oxide and glycol-based polymers, polyvinyl pyrrolidone-based polymers, methyl vinyl ether, maleic acid-based polymers, polyoxazoline-based polymers and polyquaternium II are disclosed, as well as solvent-soluble acrylates and stearic and azelaic acids. Soluble supports can eliminate scarring of the model surface and the need to use force in removing supports.

In extrusion based systems, a variation of applying release material in layers has been implemented, in which the release material is applied in short bead segments (termed "perforations") between the support structure and the model under construction. The perforations reduce adhesion of the support layer by limiting the area of contact with the model, to aid in the removal of breakaway supports.

There is a continuing need to provide a support structure that releases from a three-dimensional model without the application of force and that will not mar the model surface finish, and that further has good mechanical strength and is compatible with the modeling process and the modeling material.

BRIEF SUMMARY OF THE INVENTION

The present invention is an improved deposition modeling process which uses an alkali-soluble thermoplastic material for forming an alkali-soluble support structure for a three-dimensional object under construction or for forming an alkali-soluble three-dimensional object. The alkali-soluble material comprises a base polymer containing a carboxylic acid, and a plasticizer. In the preferred embodiment, the carboxylic acid is methacrylic acid and the base polymer further contains an alkyl methacrylate, preferably methyl methacrylate. The alkyl methacrylate comonomer provides thermal and toughness properties suitable for depositing modeling, while the plasticizer reduces the viscosity and increases the melt flow index of the base polymer. A support structure or object formed from the alkali-soluble thermoplastic material dissolves when placed in an alkaline bath.

DETAILED DESCRIPTION

The process of the present invention employing an alkali-soluble thermoplastic material is applicable for use in three-dimensional modeling systems which deposit molten modeling material that solidifies to form an object.

The present invention is described with reference to a deposition modeling system of the type disclosed in U.S. Pat. No. 5,121,329 and U.S. Pat. No. 6,004,124, which are hereby incorporated by reference as if set forth fully herein. In the described embodiment, the modeling material and the support material are deposited as substantially continuous strands layer-by-layer from an extrusion head and are supplied to the extrusion head in the form of a flexible filament. It will be understood by those skilled in the art that the invention can be practiced with advantage in various other types of modeling machines as well, and that the materials may be supplied in alternative forms, such as a liquid, solid rod, pellet or granulated form.

Figure 1:
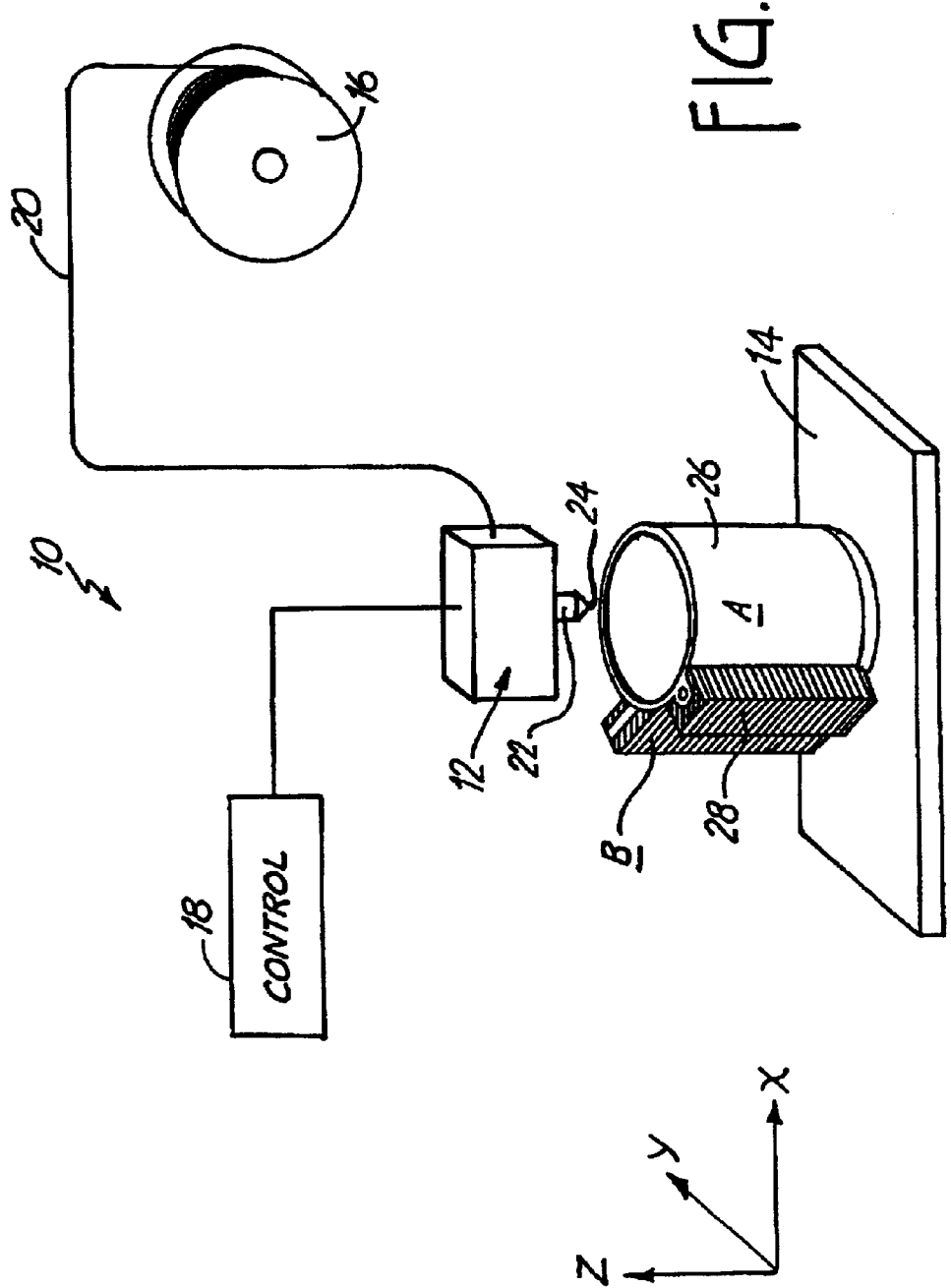
FIG. 1 is a diagrammatic illustration of a model formed by a filament-feed extrusion apparatus using the alkali-soluble material of the present invention as a support structure.

FIG. 1 shows an extrusion apparatus 10 building a model 26 supported by a support structure 28 according to the present invention. The extrusion apparatus 10 includes an extrusion head 12, a material-receiving base 14, a filament supply spool 16 and a control 18. Extrusion head 12 moves in X and Y directions with respect to base 14, which moves in a vertical or Z direction. Supply spool 16 supplies a flexible filament 20 to extrusion head 12. Filament 20 typically follows a rather tortuous path through extrusion apparatus 10, and is advanced towards extrusion head 12 by means of stepper motor-driven pinch rollers. Filament 20 is melted in a liquifier 22, carried by extrusion head 12. The liquifier 22 heats the filament to a temperature slightly above its solidification point, reducing it to a molten state. Molten material is extruded through an orifice 24 of liquifier 22 onto base 14.

The extrusion apparatus 10 of the disclosed embodiment has no positive cut-off valve for stopping flow of the molten material through orifice 24 when a layer or a pass is complete. The flow is stopped by ceasing to advance filament 20 into extrusion head 12. The flow rate at which the molten material is dispensed onto base 14 is determined by a combination of the orifice size and the rate at which filament 20 is advanced into extrusion head 12.

The movement of extrusion head 12 is controlled by control 18 so as to deposit material onto base 14 in multiple passes and layers to build three-dimensional model 26 having a shape determined by stored CAD data and further to build support structure 28 defined so as to physically support the model 26 as it is being built. The model 26 and its support structure 28 are built up on the base 14 within a build envelope having an environment controlled to promote solidification. A first layer of the deposited material adheres to the base so as to form a foundation, while subsequent layers of material adhere to one other. A base that has been successfully used is a polymer foam removably mounted to a platform. Other materials that may serve as a base include sandpaper formed of a fine wire mesh screen coated with sand and adhered to a platform, a water-soluble wax, a foam plastic material, and an acrylic sheet mounted to a vacuum platen.

A modeling material A is dispensed to form the model 26. An alkali-soluble support material B is dispensed in coordination with the dispensing of modeling material A to form the support structure 28. For convenience, the extrusion apparatus 10 is shown with only one filament supply spool 16 providing a single filament 20. It should be understood, however, that in the practice of the present invention using a filament-feed apparatus such as disclosed herein the modeling material A and the alkali-soluble support material B are provided to the extrusion apparatus 10 on separate filament supply spools. The extrusion apparatus 10 may then accommodate the dispensing of two different materials by: (1) providing two extrusion heads 12, one supplied with modeling material A and one supplied with modeling material B (such as is disclosed in the '124 patent); (2) providing a single extrusion head supplied with both the modeling material A and the alkali-support material B, with a single nozzle for dispensing both materials (such as shown in FIG. 6 of the '329 patent); or (3) providing a single extrusion head supplied with both materials, with each material dispensed through a separate nozzle (such as shown in FIG. 6 of the '785 patent).

Modeling material A is typically a thermoplastic material that can be heated relatively rapidly from a solid state to a predetermined temperature above the solidification temperature of the material, and preferably has a relatively high tensile strength. An acrylonitrile-butadiene-styrene (ABS) composition is one particularly suitable modeling material. Other materials that may be used for the modeling material A include a variety of waxes, paraffin, a variety of thermoplastic resins, metals and metal alloys. Glass and chemical setting materials, including two-part epoxies, would also be suitable.

Support material B of the present invention is a thermoplastic soluble in an alkaline solution, as described in more detail below. Alkali-soluble support material B likewise can preferably be heated relatively rapidly from a solid state filament to a predetermined temperature above the solidification temperature of the material, and solidify upon a drop in temperature after being dispensed.

The soluble support structure 28 created with support material B may be formed in a known manner, such as disclosed in U.S. Pat. No. 5,503,785, which is hereby incorporated by reference as if set forth fully herein. FIGS. 3–5 of the '785 patent illustrate a removable support structure. As shown in FIG. 1 herein, the support structure 28 may be built entirely out of the support material B. Or, as shown and described in the '785 patent, the alkali-soluble support material B may form a dissolvable joint between the model formed of modeling material A and a support structure formed of the same material A. The joint can be a release layer or layers, or a thin coating.

Figure 2:
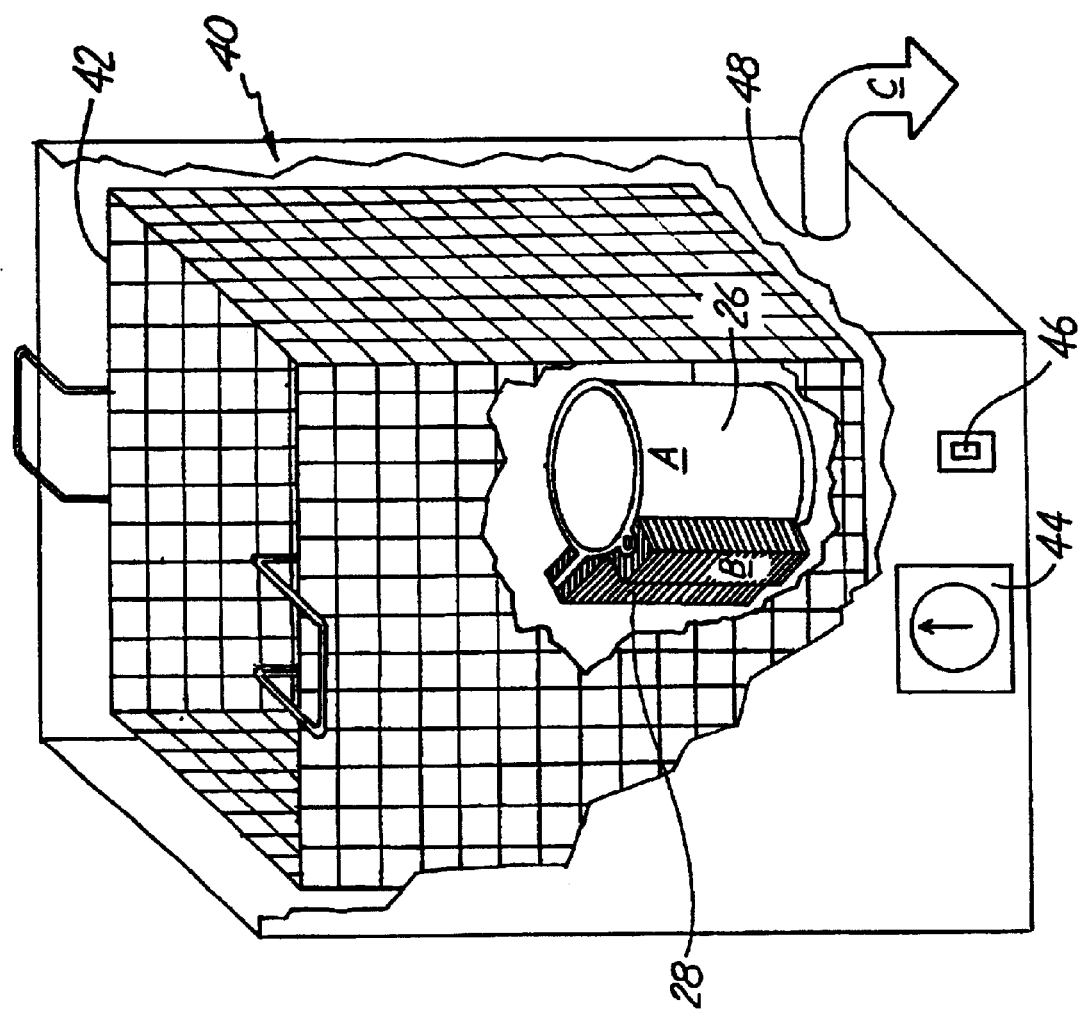
FIG. 2 is a perspective view (portions broken away) of the model of FIG. 1 in an alkaline bath used in practicing the process of the present invention.

After completion of the model 26, the support structure 28 is removed from the model 26 by soaking the model 26 with its attached support structure 28 in a bath 40 containing a alkaline solution C. In the embodiment shown in FIG. 2, bath 40 is an ultrasonic, temperature-controlled bath which contains a removable mesh basket 42 for holding the model 26. The temperature of bath 40 is set using a temperature control 44. The alkaline solution C is an aqueous solution that can be washed down the drain for disposal. The temperature of the solution C in bath 40 can be heated to speed dissolution of support material B. An ultrasonic frequency generator 46 having an on/off switch starts and stops the ultrasonic transmission. The ultrasonic frequency transmission generates air bubbles which assist in dissolving away the support material B by vibrating the model.

Model 26 remains in bath 40 until the support material B dissolves. The basket 42 is then removed from bath 40. The basket 42 can be placed in a sink and the solution C rinsed off of the model 26 with water and washed down the drain. Bath 40 has a drain 48 from which a plug is removed to drain the solution C from the bath 40.

As an alternative to removing support structure 28 from the model 26 by dissolving the support material B in a bath, the support material may be dissolved using water jets operated by hand or by automation.

The base 14 may be removed from the model 26 before placing the model in the bath 40. Alternatively, the base 14 may remain adhered to model 26 as it is placed in bath 40. In the latter case, an alkali-soluble base may be desired, such as an alkali-soluble foam.

The alkali-soluble support material B must satisfy a large number of modeling criteria for the particular modeling system in which it is used, relating generally to thermal properties, strength, viscosity and adhesion. As to thermal properties, the support material B must not deform at the temperature in the build envelope, so as to maintain structural fidelity of the model that it supports. It is therefore desired that the support material B have a glass transition temperature ($T_g$) at least 10° C. above the build envelope temperature. Further, if the glass transition temperature of support material B is lower than that of modeling material A, the rate of dissolution of support material B may be increased by temperature control.

The support material B must have a melt viscosity suitable for the modeling process. In a modeling system of the type described herein, the melt viscosity must be low enough at the liquifier temperature so that it can be extruded through the orifice of the liquifier as a generally continuous strand or bead and so that deposited strands or beads of support material B have little melt strength, allowing them to lay flat rather than curl up. Melt viscosity is lowered by increasing the temperature in the liquifier. Too high a liquifier temperature, however, can cause material sitting idle in the liquifier to decompose. If decomposed, in the case of an extrusion head that has no positive cut-off mechanism, support material B will drain uncontrollably from the liquifier into the build envelope, a condition referred to as "ooze". In practice, viscosity may be measured by its inverse parameter, melt flow. A desirable melt flow index for support material B is greater than about 1 g/10 minutes, as measured by ASTM D1238, under a load of 1.2 kg at 230° C., and is preferably between 5–10 g/10 minutes.

To properly support the model under construction, the support material B must bond to itself (self-laminate) and bond weakly to modeling material A (co-laminate). Where the support structure is built up from the base, support material B must additionally bond to the base 14. The acid content in support material B of the present invention makes the material fairly sticky, so that it will adequately adhere to a base made of any number of materials. For example, a polyurethane foam base has been successfully utilized in the practice of the invention.

To produce an accurate model, support material B must also exhibit little shrinkage upon cooling in the conditions of the build envelope, or, the shrink characteristics must match those of modeling material A. A shrink differential in the materials would cause stresses and bond failures along the model/support structure joint.

Support material B must have sufficient mechanical strength in solid form to provide support to a model during its formation. The support material B must resist forces by the modeling material A, or the model will exhibit undesirable curling and deformation. Additionally, support material B, when supplied in filament or rod form, must be strong enough to be shipped without breaking. When supplied in filament form, support material B must further have the strength and flexibility to be formed into a filament, be spooled and unspooled, and be fed through the extrusion apparatus without breakage. Similarly, support material B supplied in filament form must have sufficient rigidity to not be deformed by compressive forces during feeding through the extrusion apparatus. A tensile strength on the order of 1000–5000 psi is typically appropriate for deposition modeling applications.

Solubility characteristics required of support material B are that it be readily soluble in an alkaline solution (pH 7 or higher) that does not adversely affect the modeling material A. It is additionally desirable that the solution be non-toxic and non-flammable, so that it requires no special handling or disposal by users.

The thermoplastic soluble support material B of the present invention is comprised of a base polymer and a plasticizer. The base polymer is comprised of a first comonomer (which contains carboxylic acid) and a second comonomer that is polymerized with the first comonomer (e.g., via free-radical polymerization) to provide thermal and toughness properties suitable for deposition modeling. An alkyl methacrylate (including methyl, ethyl, propyl and butyl methacrylate), or a combination of alkyl methacrylates, is a suitable second comonomer. Other monomers may be used as the second comonomer, that achieve the thermal and toughness characteristics desired for the modeling system in which the support material B will be used. A preferred base polymer is comprised of methacrylic acid as the first comonomer and methyl methacrylate as the second comonomer. The polymer is plasticized to attain Theological properties desired for the modeling process.

A desirable amount of the acid-containing first comonomer is 15–60 weight percent of the base polymer. The solubility of the support material B is due to the carboxylic acid in the base polymer. As the acid content of the base polymer increases, the required alkalinity (pH) of the alkaline solution used to dissolve it decreases. Optionally, additional monomers can be incorporated into the base polymer.

Selection of an appropriate plasticizer depends on a number of factors. The plasticizer must plasticate the dry base polymer into a processable thermoplastic meeting the desired criteria. A plasticizer reduces viscosity (increasing the melt flow index) and also lowers glass transition temperature of a polymer. In addition, the plasticizer must be compatible with the base polymer. Compatibility is determined by polarity, dispersion and hydrogen bonding forces, as shown by Small's solubility parameters of 8.0 or higher, preferably 8.5 or higher (using Small's molar attraction constant method), or as shown by Hansen's solubility parameters of 17.0, preferably 17.5 or higher (from Hansen method described in *Handbook of Solubility Parameters*, CRC Press (1991). The plasticizer must not exhibit exudation in the form of an oily film on the plasticized polymer. The plasticizer must have a low vapor pressure at material processing and modeling temperatures, preferably less than 10 mm Hg at 200° C. and less than 20 mm Hg at 250° C. The plasticizer must additionally be hydrolyzable, soluble, emulsifiable or dispersable in an alkali solvating bath, pH 7 or higher.

Plasticizers found to be compatible include plasticizers in the general classes of dialkyl phthalates, cycloalkyl phthalates, benzyl and aryl phthalates, alkoxy phthalates, alkyl/aryl phosphates, carboxylic acid esters, polyglycol esters, adipate esters, citrate esters, and esters of glycerin. Commercially available plasticizers with specific structure found to be compatible include:

Acetates:
cumyl phenyl acetate;
Glyceryl Triacetate, triacetin;
Adipates:
dibutoxy ethoxy ethyl adipate
dibutoxy ethyl adipate
di iso butyl adipate
Citrates:
tri-n-ethyl citrate;
acetyl tri-n-ethyl citrate;
tri-n-propyl citrate;
acetyl tri-n-propyl citrate;
tri-n-butyl citrate;
acetyl tri-n-butyl citrate;
Phthalates:
DBP, dibutyl phthalate (partial compatibility);
BBP, butyl benzyl phthalate (total compatibility);
DBEP dibutoxy ethyl phthalate (partial compatibility);
2 ethyl hexyl benzyl phthalate;
tetramethyl oxa onononyl benzyl phthalate;
Benzoates:
dipropylene glycol dibenzoate;
diethylene glycol dibenzoate;
50/50 blend dipropylene glycol dibenzoate and diethylene glycol dibenzoate;
1,4 cyclohexane dimethanol dibenzoate;
glyceryl tribenzoate;
cumyl phenyl benzoate;
neopentyl glycol dibenzoate;
pentaerythritol tetabenzoate;
Phosphates:
butyl phenyl diphenyl phosphate;
TCP, tricresyl phosphate;
2 ethylhexyl diphenyl phosphate;
isodecyl diphenyl phosphate;
C12, C16 alkyl diphenyl phosphate;
isopropylated triphenyl phosphate;
Polyglycols:
Polyethylene glycols;
Polypropylene glycols.

Particularly preferred plasticizers have high thermal stability, and include: p-t-butylphenyl diphenyl phosphate; butyl benzyl phthalate; 7-(2,6,6,8-tetramethyl-4-oxa-3-oxononyl) benzyl phthalate; C7/C9 alkyl benzyl phthalate; 2-ethylhexyl diphenyl phosphate; and isodecyl diphenyl phosphate. Desirably, the plasticizer is added in amounts of between 10–30 weight percent of the support material B.

Optionally, the support material B may contain other components as well, such as filler materials. For example, inert fillers may be selected from a polymer filler group consisting of calcium carbonate, magnesium carbonate, glass spheres, graphite, carbon black, carbon fiber, glass fiber, talc, wollastonite, mica, alumina, silica, kaolin, whiskers and silicon carbide. Inorganic fillers such as soluble salts may also be used.

Techniques conventional in polymer chemistry are used to compound the component materials into support material B. The formulation may be molded into rods, pellets or other shapes for use in the extrusion apparatus, or it may be used directly in the apparatus without prior solidification. Alternatively, the mixture may be solidified and then granulated, for supply to the extrusion apparatus in granulated form. For use in the modeling process shown and described herein, a granulated feedstock composition is processed through conventional extrusion apparatus to form continuous flexible filaments. Desirably, these filaments are wound in continuous lengths on a spool and dried. Support material B in filament form is supplied to the extrusion apparatus 10 as described above. The filament 20 is typically of a very small diameter, on the order of 0.070 inches, and may be as small as 0.001 inches in diameter.

EXAMPLE I

The soluble thermoplastic composition contains 74 weight percent of the base polymer and 26 weight percent of butyl phenyl diphenyl phosphate plasticizer. The base polymer consists of a higher and a lower molecular weight copolymer of methacrylic acid and methyl methacrylate. The base polymer contains roughly 50 weight percent of the higher molecular weight copolymer and 50 weight percent of the lower molecular weight copolymer, plus or minus 5 weight percent of each. Each copolymer contains a 1:2 weight percent ratio of methacrytic acid to methyl methacrylate. The higher molecular weight copolymer is characterized by a high viscosity (low melt flow), and the low molecular weight copolymer is characterized by a low viscosity (high melt flow). Melt flow of the copolymers is measured by plasticizing each copolymer separately with 26 weight percent of the butyl phenyl diphenyl phosphate plasticizer. The melt flow index of the plasticized high molecular weight copolymer is in the range of 0.4 to 0.8 g/10 minutes, as measured by ASTM D1238, 1.2 kg at 230° C. The melt flow index of the plasticized low molecular weight copolymer is in the range of 28 to 35 g/10 minutes. The resulting thermoplastic composition has a melt flow index of 5–6.5 g/10 minutes and a glass transition temperature of about 90° C.

The thermoplastic is processed into a 0.070 inch diameter filament and wound on a spool. The filament is fed to a Stratasys FDM® 1650 or a Stratasys FDM® 2000 benchtop model machine. Molten soluble thermoplastic is extruded from a liquifier having a temperature of 200° C. into a 70° C. build envelope onto a polyurethane foam base. The extruded alkali-soluble thermoplastic has a road width of about 0.020 in. −0.040 in. and a road height (slice interval) of about 0.007 in. −0.020 in. A model is built from ABS thermoplastic having a glass transition temperature of 104°

C., using the alkali-soluble thermoplastic to form supports. The model with the attached supports is placed into an ultrasonic cleaning bath (having a scanning frequency of 25–27 Hz), containing an alkaline aqueous solution of approximately 98.7 weight percent water, 0.85 weight percent water softener, 0.30 weight percent pH adjuster and 0.15 weight percent surfactant, resulting in a pH of 11 to 13. The bath temperature is set to 70° C. (the bath temperature must remain lower than the glass transition temperature of modeling material A). In two hours time or less the supports are dissolved.

An alternative base polymer formulation combines the higher molecular weight 1:2 copolymer of methacrylic acid and methyl methacrylate with a lower molecular weight copolymer containing 40 weight percent methacrylic acid and 60 weight percent butyl methacrylate. A further alternative base polymer formulation uses acrylic acid as the first comonomer. The further alternative was found unacceptable for use in the Stratasys FDM® modeling machines, however, as it results in a base polymer having a lower glass transition temperature lower than the build envelope temperature of the machines.

EXAMPLE II

The alkali-soluble thermoplastic material contains 79+/− five weight percent of the base polymer and 21 weight percent+/−5 weight percent of butyl phenyl diphenyl phosphate plasticizer. The base polymer consists of a 1:1 weight percent ratio of methacrylic acid to methyl methacrylate, having a molecular weight of 135,000 grams/mole. Prior to compounding the base polymer with the plasticizer, the base polymer Is heated in a 220° C. oven at low pressure to rid the polymer of water. Heating at low pressure for 10–15 hours was found sufficient to dry the base polymer. The resultant dry polymer is in the form of granules, which are fed into a compounder with the plasticizer in a known manner. The resulting composition has a melt flow index in the range of 5–6.5 g/10 minutes at 230° C. The glass transition onset temperature of the composition is about 101.5° C. and the glass transition peak temperature is about 111° C.

As in Example I above, the composition is processed into a 0.070 inch diameter filament and wound on a spool. The filament is fed to a Stratasys FDM® 1650 or a Stratasys FDM® 2000 benchtop model machine. Molten soluble thermoplastic is extruded from a liquifier having a temperature of 235° C. into a build envelope having a temperature of 70° C. to 80° C., onto a polyurethane foam base. The extruded alkali-soluble thermoplastic has a road width of about 0.020 in. -0.040 in. and a road height (slice interval) of about 0.007 in.–0.020 in. A model is built from ABS thermoplastic having a glass transition temperature of 104° C., using the alkali-soluble thermoplastic to form supports. To dissolve the supports, the model is placed into an ultrasonic cleaning bath set to 70° C. and having a scanning frequency of 25–27 Hz, containing an alkaline aqueous solution of approximately 98.7 weight percent water, 0.85 weight percent water softener, 0.30 weight percent pH adjuster and 0.15 weight percent surfactant. In two hours time or less the supports are dissolved. The alkali-soluble thermoplastic according to this example exhibits thermal properties, mechanical strength, viscosity, adhesion, solubility and processing characteristics suitable for three-dimensional modeling on the Stratasys filament-feed benchtop machines.

EXAMPLE III

The alkali-soluble thermoplastic material has the same composition as in Example II above, but in this example the base polymer is not heated to release moisture. The thermoplastic material is processed and extruded from a Stratasys FDM® machine as in Example II, and deposited to form a support structure for a model built of ABS thermoplastic. In this example, the support material exhibited a greater amount of "ooze" from the extrusion head than is desirable, but otherwise exhibited characteristics suitable for three-dimensional modeling. The "ooze" is attributable to water present in the composition. If used in a modeling system wherein the material dispenser has a positive cut-off mechanism, the "ooze" effect exhibited in the Stratasys FDM® machine would not occur and the material according to this Example III could be effectively utilized.

Although the present invention has been described with reference to preferred embodiments, workers skilled in the art will recognize that changes may be made in form and detail without departing from the spirit and scope of the invention. For example, it will be appreciated that innumerable modifications may be made to the modeling process. It will further be appreciated that various modifications may be made to the composition. Also, the thermoplastic material of the present invention could be used to create an alkali-soluble three-dimensional object having usefulness in various molding processes. For example, the alkali-soluble material can form a dissolvable master core in a cast or injection process. The alkali-soluble material can likewise be used to create a mold (by deposition modeling or otherwise), which mold can later be dissolved out of an object formed by molding processes.

What is claimed is:

1. In a process for making a three-dimensional object by dispensing solidifiable modeling material in a predetermined pattern so as to define the three-dimensional object in coordination with dispensing solidifiable support material so as to define a support structure for the three-dimensional object, the support structure thereby having portions thereof in contact with the object, the improvement comprising:
   forming at least those portions of the support structure contacting the object from an alkali-soluble thermoplastic material comprising:
   a base polymer containing a carboxylic acid; and
   a plasticizer.

2. The process of claim 1, wherein the carboxylic acid is methacrylic acid present in an amount between about 15 weight percent and 60 weight percent of the base polymer.

3. The process of claim 2, wherein the base polymer further contains an alkyl methacrylate.

4. The process of claim 3, wherein the alkyl methacrylate is methyl methacrylate.

5. The process of claim 4, wherein the base polymer contains between about a 1:1 to a 1:2 weight percent ratio of methacrylic acid to methyl methacrylate.

6. The process of claim 4, wherein the alkali-soluble thermoplastic material contains between about 84 weight percent and 74 weight percent of the base polymer and contains between about 16 weight percent and 26 weight percent of the plasticizer.

7. The process of claim 1, wherein the base polymer further contains an alkyl methacrylate.

8. The process of claim 2, wherein the alkali-soluble thermoplastic material contains between about 10 weight percent and 30 weight percent of the plasticizer.

9. The process of claim 8, wherein the plasticizer is p-t-butylphenyl diphenyl phosphate, butyl benzyl phthalate, 7-(2,6,6,8-tetramethyl-4-oxa-3-oxononyl) benzyl phthalate, C7/C9 alkyl benzyl phthalate, 2-ethylhexyl diphenyl phosphate or isodecyl diphenyl phosphate.

10. The process of claim 1, wherein the alkali-soluble thermoplastic material has a melt flow index of between about 5 g/10 minutes and 10 g/10 minutes under a load of 1.2 kg at 230° C.

11. The process of claim 1 and further comprising:
removing the support structure after the object is made by placing the object in an alkaline bath.

12. The process of claim 11, wherein the step of removing the support structure includes the step of generating an ultrasonic frequency in the alkaline bath.

13. The process of claim 11, wherein the step of removing the support structure includes the step of heating the alkaline bath.

14. An additive process for making three-dimensional objects, comprising:
dispensing an alkali-insoluble modeling material in a predetermined pattern defining a three-dimensional object having overhanging portions that require support during formation; and
dispensing an alkali-soluble support material in the space beneath the overhanging portions of the three-dimensional object in coordination with the dispensing of the modeling material to form a three-dimensional support structure for the object, the alkali-soluble support material comprising a base polymer containing between about 15 weight percent and 60 weight percent of a carboxylic acid, and a plasticizer;
whereby the alkali-soluble support material may be dissolved from the three-dimensional object by application of an alkaline solution.

15. The process of claim 14, wherein the carboxylic acid is methacrylic acid.

16. The process of claim 15, wherein the base polymer further contains an alkyl methacrylate.

17. The process of claim 16, wherein the alkyl methacrylate is methyl methacrylate.

18. The process of claim 17, wherein the base polymer contains between about a 1:1 to a 1:2 weight percent ratio of methacrylic acid to methyl methacrylate.

19. The process of claim 17, wherein the alkali-soluble support material contains between about 84 weight percent and 74 weight percent of the base polymer aid contains between about 16 weight percent and 26 weight percent of the plasticizer.

20. The process of claim 14, wherein the base polymer further contains an alkyl methacrylate.

21. The process of claim 14, wherein the alkali-soluble support material contains between about 10 weight percent and 30 weight percent of the plasticizer.

22. The process of claim 21, wherein the plasticizer is p-t-butylphenyl diphenyl phosphate, butyl benzyl phthalate, 7-(2,6,6,8-tetramethyl-4-oxa-3-oxononyl) benzyl phthalate, C7/C9 alkyl benzyl phthalate, 2-ethylhexyl diphenyl phosphate or isodecyl diphenyl phosphate.

23. The process of claim 14, wherein the alkali-soluble thermoplastic material has a melt flow index of between about 5 g/10 minutes and 10 g/10 minutes under a load of 1.2 kg at 230° C.

24. In a process for making three-dimensional objects by depositing solidifiable material onto a base, the improvement comprising
providing as the solidifiable material an alkali-soluble thermoplastic comprising:
a base polymer containing a carboxylic acid; and
a plasticizer.

25. The process of claim 24, wherein the base is contained in a build envelope maintained at a build envelope temperature and wherein the plasticizer is selected and present in an amount so as to increase the melt flow index of the base polymer, while maintaining the glass transition temperature of the base polymer at a temperature high enough so that the solidifiable material does not soften at the build envelope temperature.

26. The process of claim 24, wherein the carboxylic acid is methacrylic acid present in an amount between about 15 weight percent and 60 weight percent of the base polymer.

27. The process of claim 26, wherein the base polymer further contains an alkyl methacrylate.

28. The process of claim 27, wherein the alkyl methacrylate is methyl methacrylate.

29. The process of claim 28, wherein the base polymer contains between about a 1:1 to a 1:2 weight percent ratio of methacrylic acid to methyl methacrylate.

30. The process of claim 28, wherein the solidifiable material contains between about 84 weight percent and 74 weight percent of the base polymer and contains between about 16 weight percent and 26 weight percent of the plasticizer.

31. The process of claim 25, wherein the base polymer further contains an alkyl methacrylate.

32. The process of claim 25, wherein the solidifiable material has a melt flow index of between about 5 g/10 minutes and 10 g/10 minutes under a load of 1.2 kg at 230° C.

33. The process of claim 26, wherein the solidifiable material contains between about 10 weight percent and 30 weight percent of the plasticizer.

34. The process of claim 33, wherein the plasticizer is p-t-butylphenyl diphenyl phosphate, butyl benzyl phthalate, 7-(2,6,6,8-tetramethyl-4-oxa-3-oxononyl) benzyl phthalate, C7/C9 alkyl benzyl phthalate, 2-ethylhexyl diphenyl phosphate or isodecyl diphenyl phosphate.

35. As an article of manufacture, a three-dimensional object comprised of an alkali-soluble thermoplastic material comprising:
a base polymer containing a carboxylic acid; and
a plasticizer.

36. The article of claim 35, wherein the carboxylic acid is methacrylic acid present in an amount between about 15 weight percent and 60 weight percent of the base polymer.

37. The article of claim 36, wherein the base polymer further contains an alkyl methacrylate.

* * * * *

UNITED STATES PATENT AND TRADEMARK OFFICE
CERTIFICATE OF CORRECTION

PATENT NO. : 6,790,403 B1
DATED : September 14, 2004
INVENTOR(S) : William R. Priedeman Jr. et al.

It is certified that error appears in the above-identified patent and that said Letters Patent is hereby corrected as shown below:

Column 1,
Line 34, delete "U.S. Pat No. 6,303,141", insert -- U.S. Pat No. 5,303,141 --

Column 6,
Line 51, delete "Theological", insert -- rheological --

Signed and Sealed this

Twenty-eighth Day of June, 2005

JON W. DUDAS
*Director of the United States Patent and Trademark Office*